(12) United States Patent
Tamura et al.

(10) Patent No.: US 10,364,339 B2
(45) Date of Patent: Jul. 30, 2019

(54) POLYAMIDE RESIN COMPOSITION AND MOLDED ARTICLE PRODUCED THEREFROM

(71) Applicant: KURARAY CO., LTD., Kurashiki-shi (JP)

(72) Inventors: Kozo Tamura, Chiyoda-ku (JP); Hideaki Suzuki, Tsukuba (JP); Shimon Kanai, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/897,123

(22) PCT Filed: Jun. 13, 2014

(86) PCT No.: PCT/JP2014/065698
§ 371 (c)(1),
(2) Date: Dec. 9, 2015

(87) PCT Pub. No.: WO2014/200082
PCT Pub. Date: Dec. 18, 2014

(65) Prior Publication Data
US 2016/0130422 A1  May 12, 2016

(30) Foreign Application Priority Data

Jun. 13, 2013 (JP) ................................. 2013-124491

(51) Int. Cl.
| | |
|---|---|
| C08K 5/5313 | (2006.01) |
| C08K 7/14 | (2006.01) |
| C08K 5/13 | (2006.01) |
| C08K 5/134 | (2006.01) |
| C08K 5/524 | (2006.01) |
| C08K 5/527 | (2006.01) |
| C08L 77/06 | (2006.01) |
| C08G 69/26 | (2006.01) |
| C08K 7/02 | (2006.01) |
| C08K 5/526 | (2006.01) |

(52) U.S. Cl.
CPC ............ *C08K 5/5313* (2013.01); *C08G 69/26* (2013.01); *C08K 5/13* (2013.01); *C08K 5/524* (2013.01); *C08K 5/526* (2013.01); *C08K 5/527* (2013.01); *C08K 7/02* (2013.01); *C08L 77/06* (2013.01); *C08K 5/134* (2013.01); *C08K 7/14* (2013.01)

(58) Field of Classification Search
CPC .......... C08K 5/13; C08K 5/134; C08K 5/524; C08K 5/5313; C08K 7/02; C08K 7/14; C08K 5/49; C08L 77/06; C08G 69/26; C07C 69/96
See application file for complete search history.

(56) References Cited

U.S. PATENT DOCUMENTS 5,326,805 A * 7/1994 Sicken ...................... C08K 3/32
524/101
5,889,095 A * 3/1999 Inui ...................... C07F 9/65744
524/117
(Continued)

FOREIGN PATENT DOCUMENTS

CN      1224732 A    8/1999
CN    102648240 A    8/2012
(Continued)

OTHER PUBLICATIONS

Ciba Irgafos 168 Technical Brochure, Aug. 2009.*
(Continued)

*Primary Examiner* — Christopher M Rodd
(74) *Attorney, Agent, or Firm* — Oblon, McClelland, Maier & Neustadt, L.L.P.

(57) ABSTRACT

A polyamide resin composition includes: 100 parts by mass of (A) a polyamide having a melting point of 280 to 330° C.; 0.5 to 80 parts by mass of (B) aluminum diethylphosphinate; 0.2 to 2 parts by mass of (C) at least one phosphorous acid ester represented by formula (6) or (7); and (E) at least one reinforcing material. A mass ratio of the at least one phosphinic acid salt (B) to the at least one phosphorous acid ester (C) ((B)/(C)) is in a range of from 10 to 100. An average particle diameter of the phosphinic acid salt (B) is 0.1 to 100 µm. The polyamide resin composition does not comprise a metallic soap-based lubricant.

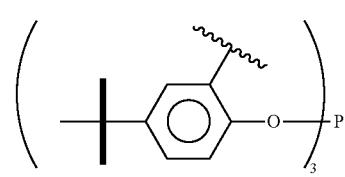

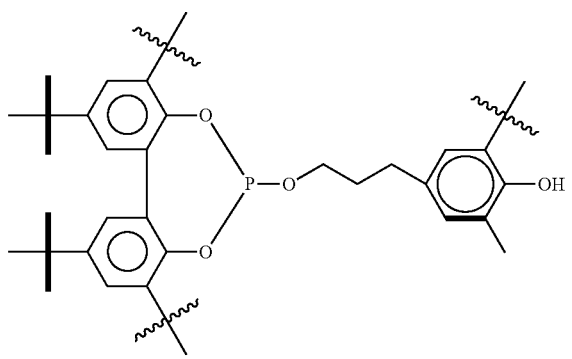

12 Claims, No Drawings

(56) References Cited

U.S. PATENT DOCUMENTS

| | | | |
|---|---|---|---|
| 6,593,485 B1 | 7/2003 | Stoll et al. | |
| 2004/0051088 A1 | 3/2004 | Schlosser et al. | |
| 2005/0014874 A1* | 1/2005 | Hoerold | C08K 5/0066 |
| | | | 524/126 |
| 2005/0137418 A1* | 6/2005 | Bauer | C07F 9/30 |
| | | | 562/8 |
| 2008/0241529 A1 | 10/2008 | Bauer et al. | |
| 2008/0242775 A1* | 10/2008 | Soma | C08K 5/3435 |
| | | | 524/130 |
| 2010/0025643 A1* | 2/2010 | Hoerold | C08K 5/5313 |
| | | | 252/609 |
| 2010/0113657 A1* | 5/2010 | Seki | C08K 5/098 |
| | | | 524/133 |
| 2010/0261819 A1* | 10/2010 | Seki | C08K 5/5313 |
| | | | 524/126 |
| 2011/0021676 A1* | 1/2011 | Hoerold | C08K 5/0066 |
| | | | 524/101 |
| 2012/0252931 A1 | 10/2012 | Pfaendner | |
| 2013/0190432 A1 | 7/2013 | Krause et al. | |

FOREIGN PATENT DOCUMENTS

| | | |
|---|---|---|
| CN | 103154110 A | 6/2013 |
| JP | 51-63859 A | 6/1976 |
| JP | 8-113672 | 5/1996 |
| JP | 9-235465 A | 9/1997 |
| JP | 11-269374 | 10/1999 |
| JP | 2002-97268 A | 4/2002 |
| JP | 2004-18857 A | 1/2004 |
| JP | 2006-265539 A | 10/2006 |
| JP | 2007-182550 A | 7/2007 |
| JP | 2007-182551 A | 7/2007 |
| JP | 2008-291217 A | 12/2008 |
| JP | 2009-275126 A | 11/2009 |
| JP | 2010-77194 A | 4/2010 |
| JP | 2010-174223 A | 8/2010 |
| JP | 2013-512979 A | 4/2013 |
| WO | 2008/126381 A1 | 10/2008 |
| WO | 2012/045414 A1 | 4/2012 |

OTHER PUBLICATIONS

Fink, A Concise Introduction to Additives for Thermoplastic Polymers, Jan. 5, 2010, p. 87.*

Zytel HTN 35 % glass fiber reinforced data sheet, downloaded Aug. 13, 2018. (Year: 2018).*

EP0584567 bibliographic data, downloaded Aug. 14, 2018. (Year: 2018).*

International Search Report dated Sep. 9, 2014 in PCT/JP14/65698 Filed Jun. 13, 2014.

Combined Chinese Office Action and Search Report dated Nov. 8, 2016 in Patent Application No. 201480033444.3 (with English translation of categories of cited documents).

* cited by examiner

POLYAMIDE RESIN COMPOSITION AND MOLDED ARTICLE PRODUCED THEREFROM

TECHNICAL FIELD

The present invention relates to a polyamide resin composition and a molded article including the same.

BACKGROUND ART

Polyamides are excellent in dynamic properties or heat resistance, and hence, they are frequently used in the field of automotive components or field of electric and electronic components. In the field of electric and electronic components, a surface mounting process with high mounting efficiency of components is diffused, and heat-resistant polyamides with high heat resistance and excellent strength are diffused as a suitable material for forming those components. In addition, in recent years, from the viewpoint of environmental loading reduction, lead-free solders are adopted as a solder to be used in the surface mounting process. However, in view of the fact that the lead-free solders are relatively high in terms of a melting temperature, it is necessary to set up a temperature in a reflow step of the surface mounting process at a high level as about 260° C. For that reason, as the heat-resistant polyamide for forming components for the surface mounting process, among heat-resistant polyamides, those having a relatively high melting point are adopted.

Now, in the field of electric and electronic components, the components are likely required to have flame retardancy, and in many cases, it is necessary to achieve a V-0 grade in the UL94 standard of Underwriters Laboratories. Hitherto, materials having a bromine-based flame retardant compounded therein have been generally used as the heat-resistant polyamide for forming electric and electronic components. However, in view of heightened awareness of the environment in the recent years, some raw materials containing noxious lead or cadmium or the like are being restrained in their use. Also, with respect to halogen-containing compounds, such as bromine-based flame retardants, etc., there is a tendency that their use is evaded irrespective of evaluation results thereof, such as safety, substantial environmental loading, etc., and a demand for halogen-free flame-retardant polyamides is increasing.

Some halogen-free flame retardants to be compounded in polyamides are known. However, flame retardants to be compounded in a heat-resistant polyamide having a high melting point are required to have high heat resistance withstanding high temperatures at the time of melt kneading on the occasion of producing a polyamide resin composition, or at the time of molding processing on the occasion of producing a molded article, in addition to the high flame retardancy. This tendency is conspicuous especially in electric and electronic components going through a reflow step of the surface mounting process.

Phosphinic acid salts are known as a halogen-free flame retardant having high flame retardancy and heat resistance. For example, a flame-retardant polyamide molding material containing a specified polyamide having a diamine unit composed mainly of an alicyclic diamine unit and a phosphinic acid salt is known (see PTL 1). In addition, a molding material containing an aliphatic polyamide and a specified phosphinic acid salt is known (see PTL 2). Furthermore, a resin composition containing a specified semi-aromatic polyamide, a polyphenylene ether, and a phosphinic acid salt is known (see PTLs 3 and 4).

Certainly, molded articles including a polyamide resin composition as described above have high flame retardancy and heat resistance; however, there may be the case where on the occasion of going through a reflow step, the brightness is conspicuously lowered, or yellowing is generated. This tendency is conspicuous especially in molded articles going through a reflow step in the presence of oxygen. The matter that the brightness is low before and after the reflow step, or that yellowing is generated after going through the reflow step, was a problem to be solved in obtaining a product having a desired color tone as a molded article after going through the reflow step of the surface mounting process for example, various connectors, such as blue connectors responding to the standard of USB 3.0, white connectors to be used for LED peripheral members, etc., or the like).

CITATION LIST

Patent Literature

PTL 1: JP 51-63859A
PTL 2: JP 9-235465A
PTL 3: JP 2007-182550A
PTL 4: JP 2007-182551A

SUMMARY OF INVENTION

Technical Problem

The present invention is to provide a polyamide resin composition which is not only excellent in flame retardancy and heat resistance but also excellent in strength, exhibits a high brightness before and after a reflow step, and even after going through the reflow step, is small in yellowing, and a molded article including the same.

Solution to Problem

As a result of extensive and intensive investigations, the present inventors have found that a polyamide resin composition containing (A) a polyamide having a melting point of 280 to 330° C., (B) a specified phosphinic acid salt, and (C) a specified phosphorous acid ester is not only excellent in flame retardancy and heat resistance but also excellent in strength, exhibits a high brightness before and after a reflow step, and even after going through the reflow step, is small in yellowing, leading to accomplishment of the present invention.

Specifically, the present invention is concerned with the following.

[1] A polyamide resin composition including 100 parts by mass of (A) a polyamide having a melting point of 280 to 330° C., 0.5 to 80 parts by mass of (B) at least one phosphinic acid salt represented by the following formula (1) or (2), and 0.001 to 7 parts by mass of (C) at least one phosphorous acid ester represented by the following formula (3) or (4):

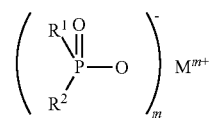

-continued

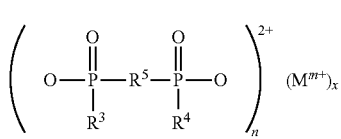
(2)

wherein each of $R^1$, $R^2$, $R^3$, and $R^4$ independently represents an alkyl group, a cycloalkyl group, an aryl group which may have an alkyl group, or an aralkyl group; $R^1$ and $R^2$, and $R^3$ and $R^4$, may be bonded to each other to form a ring together with the adjacent phosphorus atom; $R^5$ represents an alkylene group, a cycloalkylene group, an arylene group which may have an alkyl group, or an aralkylene group; $M^{m+}$ represents a cation of at least one atom selected from the group consisting of Mg, Ca, Al, Sb, Sn, Ge, Ti, Zn, Fe, Zr, Ce, Bi, Sr, Mn, Li, Na, and K, and/or a protonated nitrogen base compound; m is an integer of 1 to 4; n is an integer of 1 to 4; and x is an integer of 1 to 4,

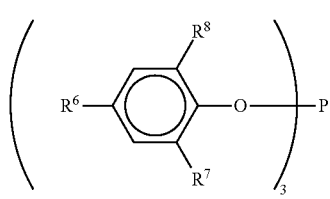
(3)

wherein $R^6$ represents an alkyl group; and each of $R^7$ and $R^8$ independently represents a hydrogen atom or an alkyl group, and

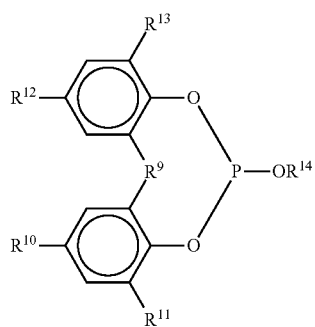
(4)

wherein $R^9$ represents a single bond or an alkylene group; each of $R^{10}$ to $R^{13}$ independently represents an alkyl group; and $R^{14}$ represents an alkyl group, an aryl group, an aralkyl group, or the following formula (5):

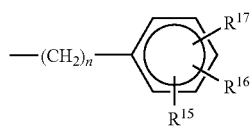
(5)

wherein each of $R^{15}$ to $R^{17}$ independently represents a hydrogen atom, a hydroxyl group, or an alkyl group; and n is an integer of 1 to 6.

[2] The polyamide resin composition as set forth in [1], wherein the phosphinic acid salt (B) is contained in an amount of 7 to 30 parts by mass based on 100 parts by mass of the polyamide (A).

[3] The polyamide resin composition as set forth in [1] or [2], wherein the phosphorous acid ester (C) is a compound represented by the following formula (6):

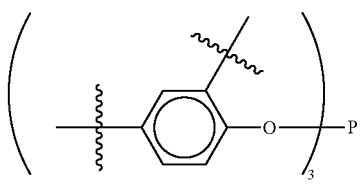
(6)

[4] The polyamide resin composition as set forth in [1] or [2], wherein the phosphorous acid ester (C) is a compound represented by the following formula (7):

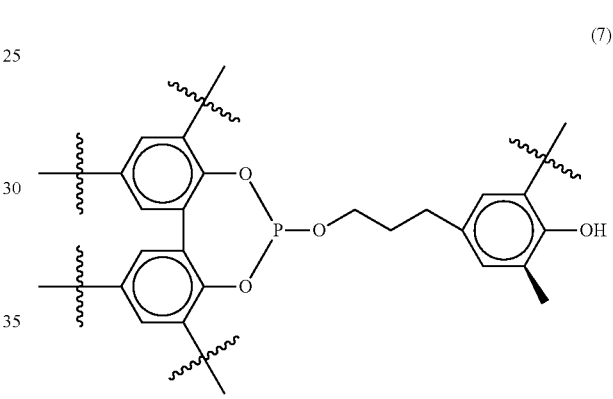
(7)

[5] The polyamide resin composition as set forth in any one of [1] to [4], wherein the phosphorous acid ester (C) is contained in an amount of 0.2 to 2 parts by mass based on 100 parts by mass of the polyamide (A).

[6] The polyamide resin composition as set forth in any one of [1] to [5], further including (D) a phenol-based stabilizer in an amount of 0.001 to 7 parts by mass based on 100 parts by mass of the polyamide (A).

[7] The polyamide resin composition as set forth in any one of [1] to [5], wherein the phenol-based stabilizer (D) is contained in an amount of 0.2 to 0.5 parts by mass based on 100 parts by mass of the polyamide (A).

[8] The polyamide resin composition as set forth in any one of [1] to [7], wherein the polyamide (A) has an aromatic dicarboxylic acid unit and an aliphatic diamine unit.

[9] The polyamide resin composition as set forth in [8], wherein the aliphatic diamine is an aliphatic diamine having 4 to 18 carbon atoms.

[10] The polyamide resin composition as set forth in any one of [1] to [9], wherein the phosphinic acid salt (B) is aluminum diethylphosphinate.

[11] The polyamide resin composition as set forth in any one of [1] to [10], further including (E) a reinforcing material.

[12] The polyamide resin composition as set forth in [11], wherein the reinforcing material (E) is a fibrous reinforcing material.

[13] A molded article including the polyamide resin composition as set forth in any one of [1] to [12].

Advantageous Effects of Invention

According to the present invention, it is possible to provide a polyamide resin composition which is not only excellent in flame retardancy and heat resistance but also excellent in strength, exhibits a high brightness before and after a reflow step, and even after going through the reflow step, is small in yellowing, and a molded article including the same.

DESCRIPTION OF EMBODIMENTS

The polyamide resin composition of the present invention comprises, as essential components, (A) a polyamide having a melting point of 280 to 330° C. (hereinafter sometimes abbreviated as "polyamide (A)"), (B) a phosphinic acid salt represented by the following formula (1) or (2) (hereinafter sometimes abbreviated as "phosphinic acid salt (B)"), and (C) a phosphorous acid ester represented by the following formula (3) or (4) (hereinafter sometimes abbreviated as "phosphorous acid ester"). The present invention is hereunder described in detail.

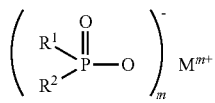
(1)

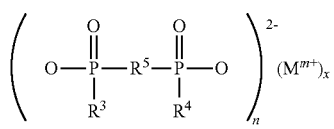
(2)

In the formulae, each of $R^1$, $R^2$, $R^3$, and $R^4$ independently represents an alkyl group, a cycloalkyl group, an aryl group which may have an alkyl group, or an aralkyl group; $R^1$ and $R^2$, and $R^3$ and $R^4$, may be bonded to each other to form a ring together with the adjacent phosphorus atom; $R^5$ represents an alkylene group, a cycloalkylene group, an arylene group which may have an alkyl group, or an aralkylene group; $M^{m+}$ represents a cation of at least one atom selected from the group consisting of Mg, Ca, Al, Sb, Sn, Ge, Ti, Zn, Fe, Zr, Ce, Bi, Sr, Mn, Li, Na, and K, and/or a protonated nitrogen base compound; m is an integer of 1 to 4; n is an integer of 1 to 4; and x is an integer of 1 to 4.

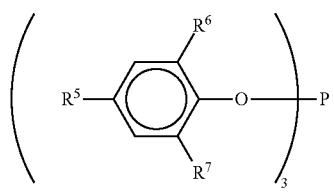
(3)

In the formula, $R^6$ represents an alkyl group; and each of $R^7$ and $R^8$ independently represents a hydrogen atom or an alkyl group.

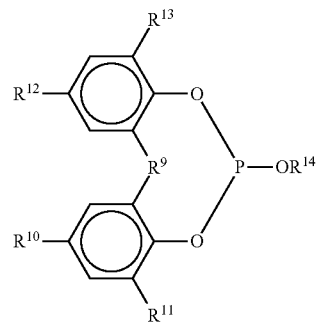
(4)

In the formula, $R^9$ represents a single bond or an alkylene group; each of $R^{10}$ to $R^{13}$ independently represents an alkyl group; and $R^{14}$ represents an alkyl group, an aryl group, an aralkyl group, or the following formula (5).

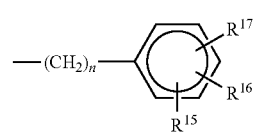
(5)

In the formula, each of $R^{15}$ to $R^{17}$ independently represents a hydrogen atom, a hydroxyl group, or an alkyl group; and n is an integer of 1 to 6.

<Polyamide (A)>

The polyamide (A) which is used in the present invention has a melting point of 280 to 330° C., and preferably 290 to 330° C. By using a polymer having a melting point falling within the foregoing range, a polyamide resin composition and a molded article each having sufficient heat resistance may be obtained.

Examples of the polyamide (A) which is used in the present invention include polyamides having a dicarboxylic acid unit, a diamine unit, and other structural unit.

Examples of the dicarboxylic acid unit constituting the polyamide (A) include an aliphatic dicarboxylic acid unit composed of malonic acid, dimethylmalonic acid, succinic acid, glutaric acid, adipic acid, 2-methyladipic acid, trimethyladipic acid, pimelic acid, 2,2-dimethylglutaric acid, 2,2-diethylsuccinic acid, suberic acid, azelaic acid, sebacic acid, undecanedioic acid, dodecanedioic acid, or the like; an alicyclic dicarboxylic acid unit composed of 1,3-cyclopentanedicarboxylic acid, 1,3-cyclohexanedicarboxylic acid, 1,4-cyclohexanedicarboxylic acid, or the like; and an aromatic dicarboxylic acid unit composed of isophthalic acid, terephthalic acid, 2,6-naphthalenedicarboxylic acid, 2,7-naphthalene dicarboxylic acid, 1,4-naphthalenedicarboxylic acid, 1,4-phenylenedioxydiacetic acid, 1,3-phenylenedioxydiacetic acid, diphenic acid, 4,4'-oxydibenzoic acid, diphenylmethane-4,4'-dicarboxylic acid, diphenylsulfone-4,4'-dicarboxylic acid, 4,4'-biphenyldicarboxylic acid, or the like. The polyamide (A) may also contain a multivalent carboxylic acid unit composed of trimellitic acid, trimesic acid, pyromellitic acid, or the like. These may be used solely or in combination of two or more kinds thereof. Above all, an aromatic dicarboxylic acid unit or an aliphatic dicarboxylic acid unit is preferred, and a terephthalic acid unit or an adipic acid unit is more preferred.

The diamine unit constituting the polyamide (A) is preferably an aliphatic diamine unit, and more preferably an aliphatic diamine unit having 4 to 18 carbon atoms from the viewpoints of heat resistance and low water absorbability.

Examples of the aliphatic diamine unit having 4 to 18 carbon atoms include a straight-chain aliphatic diamine unit composed of 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, or the like; a branched aliphatic diamine unit composed of 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine, 5-methyl-1,9-nonanediamine, 3,7-dimethyl-1,10-decanediamine, 3,8-dimethyl-1,10-decanediamine, or the like; an alicyclic diamine unit composed of cyclohexanediamine, methylcyclohexanediamine, isophoronediamine, norbornanedimethylamine, tricyclodecanedimethylamine, or the like; and an aromatic diamine unit composed of p-phenylenediamine, m-phenylenediamine, p-xylylenediamine, m-xylylenediamine, 4,4'-diaminodiphenylmethane, 4,4'-diaminodiphenylsulfone, 4,4'-diaminodiphenyl ether, or the like. These may be used solely or in combination of two or more kinds thereof.

From the same viewpoints, the aliphatic diamine having 4 to 18 carbon atoms is more preferably at least one selected from the group consisting of 1,4-butanediamine, 1,5-pentanediamine, 1,6-hexanediamine, 2-methyl-1,5-pentanediamine, 1,7-heptanediamine, 1,8-octanediamine, 1,9-nonanediamine, 2-methyl-1,8-octanediamine, 1,10-decanediamine, 1,11-undecanediamine, and 1,12-dodecanediamine. At least one of a 1,9-nonanediamine unit and a 2-methyl-1,8-octanediamine unit are still more preferred.

In the case of jointly using 1,9-nonanediamine and 2-methyl-1,8-octanediamine, from the viewpoints of heat resistance, moldability, and low water absorbability, a molar ratio of 1,9-nonanediamine and 2-methyl-1,8-octanediamine is preferably 70/30 to 95/5, and more preferably 80/20 to 90/10 in terms of 1,9-nonanediamine to 2-methyl-1,8-octanediamine.

Examples of the other structural unit constituting the polyamide (A) include a lactam unit composed of ε-caprolactam, co-lauryl lactam, or the like; and an aminocarboxylic unit composed of 11-aminoundecanoic acid, 12-aminododecanoic acid, or the like. These may be used solely or in combination of two or more kinds thereof.

An amount of the other structural unit constituting the polyamide (A) is preferably 30 mol % or less of the whole of the monomer units constituting the polyamide (A).

In the polyamide (A), terminal groups of its molecular chain may be capped with an end-capping agent. A proportion at which the terminal groups of the molecular chain are capped with the end-capping agent (end capping ratio) is preferably 10% or more, more preferably 40% or more, and still more preferably 60% or more. When the end-capped polyamide (A) is used, a polyamide resin composition being excellent in physical properties, such as melt moldability, etc., can be obtained.

By measuring the number of each of the carboxyl group and the amino group constituting the structural unit existing in the terminals of the polyamide molecular chain and the end-capping agent-originated structural unit, the end capping ratio can be determined according to the following calculation formula. The number of each of the structural units constituting the terminals of the polyamide molecule may be, for example, determined on the basis of an integrated value of characteristic signals corresponding to the respective structural units as calculated by $^1$H-NMR.

$$\text{End capping ratio (\%)} = [(Y-Z)/Y] \times 100$$

In the formula, Y represents a total number of the molecular chain terminals of the polyamide; and Z represents a sum total number of the carboxyl group and the amino group. For example, by measuring the polyamide molecular weight and doubling the number of molecular chains derived therefrom, the total number Y of the molecular chain terminals of the polyamide is calculated. Alternatively, the total number Y may also be calculated as a sum total number of the respective carboxyl group, amino group, and end-capping agent-originated structural unit.

As the end-capping agent, a monofunctional compound having reactivity with the terminal amino group or the terminal carboxyl group may be used. Examples thereof include acid anhydrides, monoisocyanates, mono-acid halides, monoesters, monoalcohols, and the like. However, in view of reactivity and stability of the capped ends, a monocarboxylic acid is preferred as the end-capping agent for the terminal amino group, whereas a monoamine is preferred as the end-capping agent for the terminal carboxyl group. From the viewpoints of ease of handling and the like, a monocarboxylic acid is more preferred as the end-capping agent.

The monocarboxylic acid which is used as the end-capping agent has only to be one having reactivity with an amino group. Examples of the end-capping agent include aliphatic monocarboxylic acids, such as acetic acid, propionic acid, butyric acid, valeric acid, caproic acid, caprylic acid, lauric acid, tridecanoic acid, myristic acid, palmitic acid, stearic acid, pivalic acid, isobutyric acid, etc.; alicyclic monocarboxylic acids, such as cyclohexanecarboxylic acid, etc.; aromatic monocarboxylic acids, such as benzoic acid, toluic acid, α-naphthalenecarboxylic acid, β-naphthalenecarboxylic acid, methylnaphthalenecarboxylic acid, phenylacetic acid, etc.; arbitrary mixtures thereof; and the like. These may be used solely or in combination of two or more kinds thereof. Above of all, acetic acid, propionic acid, butyric acid, valeric acid, caproic acid, caprylic acid, lauric acid, tridecanoic acid, myristic acid, palmitic acid, stearic acid, and benzoic acid are preferred from the viewpoints of reactivity, stability of the capped ends, price, and the like.

The monoamine which is used as the end-capping agent is not particularly limited so long as it has reactivity with a carboxyl group. Examples thereof include aliphatic monoamines, such as methylamine, ethylamine, propylamine, butylamine, hexylamine, octylamine, decylamine, stearylamine, dimethylamine, diethylamine, dipropylamine, dibutylamine, etc.; alicyclic monoamines, such as cyclohexylamine, dicyclohexylamine, etc.; aromatic monoamines, such as aniline, toluidine, diphenylamine, naphthylamine, etc.; and the like. These may be used solely or in combination of two or more kinds thereof. Above of all, butylamine, hexylamine, octylamine, decylamine, stearylamine, cyclohexylamine, and aniline are preferred from the viewpoints of reactivity, high boiling point, stability of the capped ends, and price.

The polyamide (A) can be produced by an arbitrary method which is known as the method for producing a crystalline polyamide. The polyamide (A) may be, for example, produced by a method, such as a solution polymerization method or an interfacial polymerization method, each using an acid chloride and a diamine as raw materials; a melt polymerization method, a solid-phase polymerization method, or a melt extrusion polymerization method, each using a dicarboxylic acid and a diamine as raw materials; etc., or the like.

Examples of a preferred production method of the polyamide (A) include a method in which first of all, a diamine, a dicarboxylic acid, a lactam, and an aminocarboxylic acid, and optionally, a catalyst and an end-capping agent are collectively added to produce a nylon salt, which is then heated for polymerization at a temperature of 200 to 270° C., to prepare a prepolymer having an ηinh of 0.1 to 0.6 dL/g at 30° C. in 0.2 g/dL of a concentrated sulfuric acid solution thereof (the ηinh will be hereinafter referred to simply as "ηinh"), followed by further performing solid-phase polymerization or solution polymerization. When the ηinh of the prepolymer falls within the range of from 0.1 to 0.6 dL/g, a deviation in a molar balance between the carboxyl group and the amino group at the stage of post polymerization or a decrease of polymerization rate is small, and furthermore, the polyamide (A) having a small molecular weight distribution and capable of giving a polyamide resin composition having excellent various physical properties and moldability is obtained. In the case of performing solid-phase polymerization at the final stage of polymerization, it is preferred to perform the polymerization under reduced pressure or under an inert gas stream. So long as a polymerization temperature falls within the range of from 200 to 280° C., the polymerization rate is large, the productivity is excellent, and coloration or gelation may be effectively inhibited. In the case of performing melt polymerization at the final stage of polymerization, the polymerization temperature is preferably 370° C. or lower. When the polymerization is performed under such conditions, almost no decomposition of the polyamide occurs, and the polyamide (A) with less degradation is obtained.

Examples of the catalyst which may be used on the occasion of producing the polyamide (A) include salts of phosphoric acid, phosphorous acid, or hypophosphorous acid with a metal, such as potassium, sodium, magnesium, vanadium, calcium, zinc, cobalt, manganese, tin, tungsten, germanium, titanium, antimony, etc.; ammonium salts of phosphoric acid, phosphorous acid, or hypophosphorous acid; ethyl esters, isopropyl esters, butyl esters, hexyl esters, isodecyl esters, octadecyl esters, decyl esters, or stearyl esters of phosphoric acid or hypophosphorous acid; and the like. Above all, sodium hypophosphite monohydrate or phosphorous acid is preferred.

In the polyamide (A), an ηinh at 30° C. in 0.2 g/dL of a concentrated sulfuric acid solution thereof is preferably 0.6 to 1.2 dL/g, and more preferably 0.65 to 1.1 dL/g. By using a polyamide having an ηinh falling within the foregoing range, a polyamide resin composition with excellent moldability is obtained, and a molded article with more excellent dynamic properties and heat resistance is obtained.

<Phosphinic Acid Salt (B)>

As the phosphinic acid salt (B) which is used in the present invention, at least one phosphinic acid salt (B) represented by the following formula (1) or (2) can be used. By using the phosphinic acid salt (B), a polyamide resin composition and a molded article each having sufficient flame retardancy can be obtained.

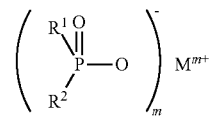 (1)

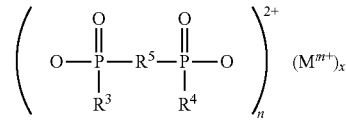 (2)

In the formulae, each of $R^1$, $R^2$, $R^3$, and $R^4$ independently represents an alkyl group, a cycloalkyl group, an aryl group which may have an alkyl group, or an aralkyl group; $R^1$ and $R^2$, and $R^3$ and $R^4$, may be bonded to each other to form a ring together with the adjacent phosphorus atom; $R^5$ represents an alkylene group, a cycloalkylene group, an arylene group which may have an alkyl group, or an aralkylene group; $M^{m+}$ represents a cation of at least one atom selected from the group consisting of Mg, Ca, Al, Sb, Sn, Ge, Ti, Zn, Fe, Zr, Ce, Bi, Sr, Mn, Li, Na, and K, and/or a protonated nitrogen base compound; m is an integer of 1 to 4; n is an integer of 1 to 4; and x is an integer of 1 to 4.

The alkyl group represented by $R^1$, $R^2$, $R^3$, and $R^4$ is preferably an alkyl group having 1 to 10 carbon atoms, and examples thereof include a methyl group, an ethyl group, an n-propyl group, an isopropyl group, an n-butyl group, an isobutyl group, a sec-butyl group, a tert-butyl group, an n-pentyl group, a neopentyl group, an n-hexyl group, and the like. The cycloalkyl group is preferably a cycloalkyl group having 1 to 10 carbon atoms, and examples thereof include a cyclohexyl group, a cyclohexadimethyl group, and the like. The aryl group which may have an alkyl group is preferably an aryl group having 1 to 10 carbon atoms, and examples thereof include a phenyl group, a tolyl group, a dimethylphenyl group, a tert-butylphenyl group, a 1-naphthyl group, a 2-naphthyl group, and the like. The aralkyl group is preferably an aralkyl group having 1 to 10 carbon atoms, and examples thereof include a phenylmethyl group, a phenylethyl group, and the like.

The ring which is formed upon bonding of $R^1$ and $R^2$, and $R^3$ and $R^4$, together with the adjacent phosphorus atom is a heterocyclic ring having the aforementioned phosphorus atom as a hetero atom constituting the ring, and the number of atoms constituting such a ring is usually 4 to 20, and preferably 5 to 16. The aforementioned heterocyclic ring having a phosphorus atom may be a bicyclo ring and may have a substituent.

The alkylene group represented by $R^5$ is preferably an alkylene group having 1 to 10 carbon atoms, and examples thereof include a methylene group, a 1,2-ethylene group, a 1,3-propylene group, a 2-methyl-1,3-propylene group, a 2,2-dimethyl-1,3-propylene group, a 1,4-butylene group, a 1,5-pentylene group, a 1,6-hexylene group, a 1,7-heptylene group, a 1,8-octylene group, a 1,9-nonylene group, a 1,10-decylene group, and the like. The cycloalkylene group is preferably a cycloalkylene group having 6 to 10 carbon atoms, and examples thereof include a cyclohexylene group, a cyclohexadimethylene group, and the like. The arylene group which may have an alkyl group is preferably an arylene group having 6 to 10 carbon atoms, and examples thereof include a 1,2-phenylene group, a 1,3-phenylene group, a 1,4-phenylene group, a tolylene group, a xylylene group, a tert-butylphenylene group, a 1,4-naphthylene group, a 1,5-naphthylene group, a 1,8-naphthylene group, a 2,6-naphthylene group, a 2,7-naphthylene group, a methylphenylene group, an ethylphenylene group, a tert-butylphenylene group, a methylnaphthylene group, an ethylnaphthylene group, a tert-butylnaphthylene group, and the like.

The aralkylene group is preferably an aralkylene group having 6 to 10 carbon atoms, and examples thereof include a phenylenemethylene group and the like.

$M^{m+}$ is preferably at least one selected from the group consisting of Mg, Ca, Al, Ti, and Zn.

Examples of the phosphinic acid salt (B) represented by the formula (1) include calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, zinc diphenylphosphinate, and the like.

Examples of the phosphinic acid salt (B) represented by the formula (2) include calcium methylenebis(methylphosphinate), magnesium methylenebis(methylphosphinate), aluminum methylenebis(methylphosphinate), zinc methylenebis(methylphosphinate), calcium 1,4-phenylenebis(methylphosphinate), magnesium 1,4-phenylenebis(methylphosphinate), aluminum 1,4-phenylenebis(methylphosphinate), zinc 1,4-phenylenebis(methylphosphinate), and the like.

Above all, as the phosphinic acid salt (B), calcium dimethylphosphinate, aluminum dimethylphosphinate, zinc dimethylphosphinate, calcium ethylmethylphosphinate, aluminum ethylmethylphosphinate, zinc ethylmethylphosphinate, calcium diethylphosphinate, aluminum diethylphosphinate, and zinc diethylphosphinate are preferred from the viewpoints of flame retardancy, electric properties, and availability; and in particular, industrially available aluminum diethylphosphinate is more preferred from the viewpoints of heat resistance and flame retardancy.

The phosphinic acid salt (B) also includes a polymer or a condensate of a multivalent salt of such a phosphinic acid salt (B).

A lower limit value of a content of the phosphinic acid salt (B) is 0.5 parts by mass, preferably 1 part by mass, and more preferably 7 parts by mass based on 100 parts by mass of the polyamide (A). An upper limit value thereof is 80 parts by mass, preferably 60 parts by mass, and more preferably 30 parts by mass. By selecting the content of the phosphinic acid salt (B) within the foregoing range, a polyamide resin composition being excellent in a balance among flame retardancy, strength, and fluidity can be obtained.

A lower limit value of an average particle diameter of the phosphinic acid salt (B) is preferably 0.1 μm, more preferably 0.5 μm, and still more preferably 1 μm. An upper limit value thereof is preferably 100 μm, more preferably 50 and still more preferably 40 μm. In a polyamide resin composition and a molded article each using the phosphinic acid salt (B) having an average particle diameter falling within the foregoing range, not only high flame retardancy is revealed, but also the strength becomes conspicuously high. The average particle diameter of the phosphinic acid salt (B) as referred to in the present description means a number average particle diameter determined from a frequency distribution of particle diameter and particle number as measured with a laser diffraction particle size analyzer by using, as a measurement sample, a dispersion liquid having the phosphinic acid salt (B) dispersed in a medium, such as water, etc. The phosphinic acid salt (B) is not always required to be completely pure, but small amounts of unreacted materials or by-products may remain. It is preferred to use the phosphinic acid salt (B) in a powdered state.

<Phosphorous Acid Ester (C)>

As the phosphorous acid ester (C) which is used in the present invention, at least one phosphorous acid ester (C) represented by the formula (3) or (4) can be used. By using the phosphorous acid ester (C), a polyamide resin composition and a molded article each having excellent strength can be obtained. A lowering of brightness of each of the polyamide resin composition and the molded article before and after a reflow step and yellowing generated after going through the reflow step can be inhibited.

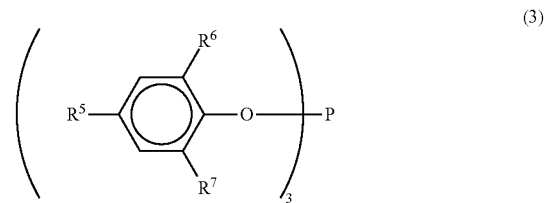

(3)

In the formula, $R^6$ represents an alkyl group; and each of $R^7$ and $R^8$ independently represents a hydrogen atom or an alkyl group.

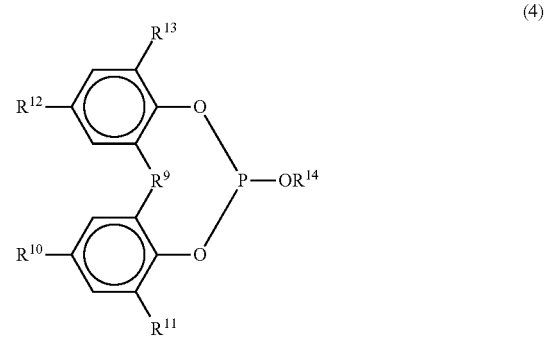

(4)

In the formula, $R^9$ represents a single bond or an alkylene group; each of $R^{19}$ to $R^{13}$ independently represents an alkyl group; and $R^{14}$ represents an alkyl group, an aryl group, an aralkyl group, or the following formula (5).

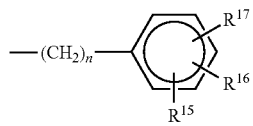

(5)

In the formula, each of $R^{15}$ to $R^{17}$ independently represents a hydrogen atom, a hydroxyl group, or an alkyl group; and n is an integer of 1 to 6.

The alkyl group represented by $R^6$ is preferably an alkyl group having 1 to 6 carbon atoms, and examples thereof include a methyl group, an ethyl group, an n-propyl group, an isopropyl group, an n-butyl group, an isobutyl group, a sec-butyl group, a tert-butyl group, an n-pentyl group, a neopentyl group, an n-hexyl group, and the like.

The alkyl group represented by $R^7$ and $R^8$ is preferably an alkyl group having 1 to 6 carbon atoms, and examples thereof include a methyl group, an ethyl group, an n-propyl group, an isopropyl group, an n-butyl group, an isobutyl group, a sec-butyl group, a tert-butyl group, an n-pentyl group, a neopentyl group, an n-hexyl group, and the like.

Examples of the alkylene group represented by $R^9$ include a methylene group, a 1,2-ethylene group, a 1,3-propylene group, a 2-methyl-1,3-propylene group, a 2,2-dimethyl-1,3-propylene group, a 1,4-butylene group, a 1,5-pentylene group, a 1,6-hexylene group, a 1,7-heptylene group, a 1,8-octylene group, a 1,9-nonylene group, a 1,10-decylene group, and the like.

The alkyl group represented by $R^{10}$ to $R^{13}$ is preferably an alkyl group having 1 to 6 carbon atoms, and examples thereof include a methyl group, an ethyl group, an n-propyl group, an isopropyl group, an n-butyl group, an isobutyl group, a sec-butyl group, a tert-butyl group, an n-pentyl group, a neopentyl group, an n-hexyl group, and the like. Examples of the aryl group include an aryl group having 6 to 10 carbon atoms, such as, a phenyl group, a tolyl group, a dimethylphenyl group, a tert-butylphenyl group, a 1-naphthyl group, a 2-naphthyl group, etc. Examples of the aralkyl group include a phenylmethyl group, a phenylethyl group, a phenylpropyl group, a phenylbutyl group, a 2,4-di-tert-butylphenyl group, and the like.

The alkyl group represented by $R^{14}$ is preferably an alkyl group having 1 to 6 carbon atoms, and examples thereof include a methyl group, an ethyl group, an n-propyl group, an isopropyl group, an n-butyl group, an isobutyl group, a sec-butyl group, a tert-butyl group, an n-pentyl group, a neopentyl group, an n-hexyl group, and the like. Examples of the aryl group include an aryl group having 6 to 10 carbon atoms, such as, a phenyl group, a tolyl group, a dimethylphenyl group, a tert-butylphenyl group, a 1-naphthyl group, a 2-naphthyl group, etc. Examples of the aralkyl group include a phenylmethyl group, a phenylethyl group, a phenylpropyl group, a phenylbutyl group, a 2,4-di-tert-butylphenyl group, and the like.

The alkyl group represented by $R^{15}$ to $R^{17}$ is preferably an alkyl group having 1 to 6 carbon atoms, and examples thereof include a methyl group, an ethyl group, an n-propyl group, an isopropyl group, an n-butyl group, an isobutyl group, a sec-butyl group, a tert-butyl group, an n-pentyl group, a neopentyl group, an n-hexyl group, and the like. Examples of the functional group represented by the foregoing formula (5) include a 3-tert-butyl-4-hydroxy-5-methylphenyl group.

Among the phosphorous acid esters (C) represented by the formula (3) or (4), a compound represented by the formula (6) (for example, IRGAFOS 168, manufactured by BASF SE) and a compound represented by the formula (7) (for example, SUMILIZER GP, manufactured by Sumitomo Chemical Co., Ltd.) are preferred.

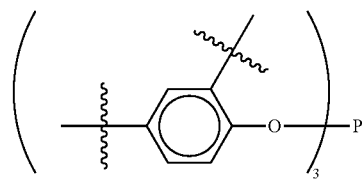

(6)

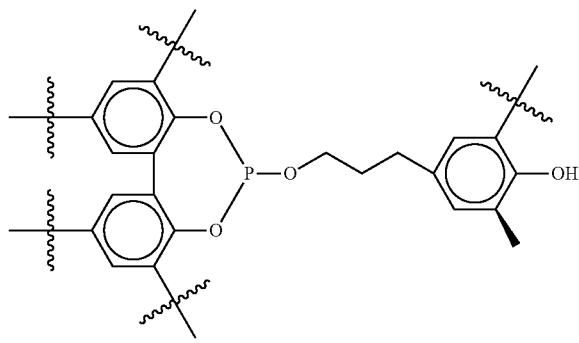

(7)

A lower limit value of a content of the phosphorous acid ester (C) is 0.001 parts by mass, preferably 0.07 parts by mass, and more preferably 0.2 parts by mass based on 100 parts by mass of the polyamide (A). An upper limit value thereof is 7 parts by mass, preferably 5 parts by mass, and more preferably 2 parts by mass. By selecting the content of the phosphorous acid ester (C) within the foregoing range, a polyamide resin composition and a molded article thereof, each of which is excellent in strength, exhibits a high brightness before and after a reflow step, and even after going through the reflow step, is small in yellowing, are obtained.

While a reason has not been elucidated yet, when the phosphinic acid salt (B) and the phosphorous acid ester (C) as described above are used in combination within the range of from 3.5 to 150 in terms of a ratio of the phosphinic acid salt (B) and the phosphorous acid ester (C) ((B)/(C)), the yellowing becomes especially small even after going through the reflow step.

<Phenol-Based Stabilizer (D)>

The polyamide resin composition of the present invention may contain (D) a phenol-based stabilizer. By using the phenol-based stabilizer (D) and the phosphorous acid ester (C) in combination, a lowering of the brightness before and after a reflow step and the yellowing after going through the reflow step, each of which occurs in the case of incorporating the phosphinic acid salt (B) in the polyamide (A), can be effectively inhibited.

With respect to the phenol-based stabilizer (D), known compounds as a phenol-based stabilizer may be used without any limitation, but a hindered phenol-based stabilizer and the like are preferred.

Among the phenol-based stabilizers (D), a compound represented by the following formula (8) (for example, IRGANOX 1098, manufactured by BASF SE) and a compound represented by the following formula (9) (for example, SUMILIZER GA-80 manufactured by Sumitomo Chemical Co., Ltd.) are preferred from the viewpoint that the effect for inhibiting a lowering of the brightness before and after a reflow step and the yellowing after going through the reflow step is large.

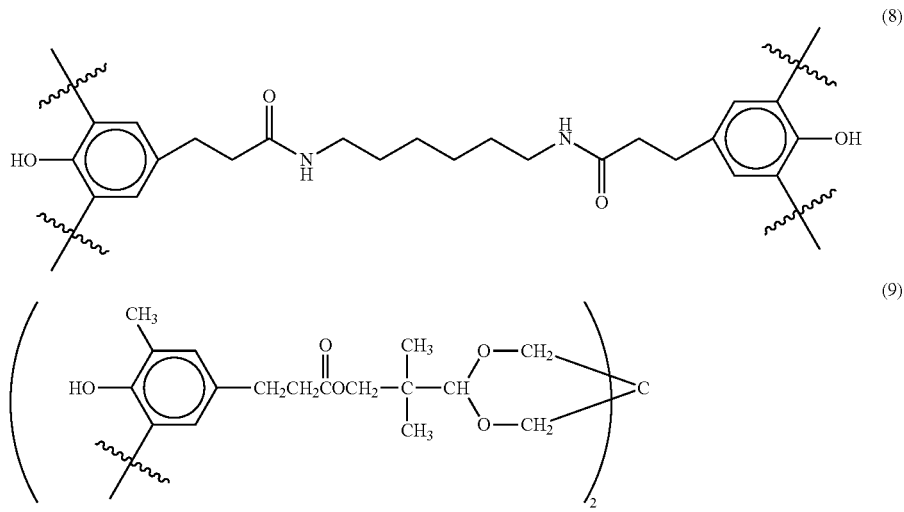

In the case of using the phenol-based stabilizer (D), a lower limit value of its content is preferably 0.001 parts by mass, more preferably 0.07 parts by mass, and still more preferably 0.2 parts by mass based on 100 parts by mass of the polyamide (A). An upper limit value thereof is preferably 7 parts by mass, more preferably 1 part by mass, and still more preferably 0.5 parts by mass. By selecting the content of the phenol-based stabilizer (D) within the foregoing range, deterioration of the polyamide resin composition of the present invention at the time of melt retention can be reduced. The brightness before and after a heat treatment of each of the polyamide resin composition and the molded article of the present invention can be increased, and the yellowing generated by the reflow step can be made small.

<Reinforcing Material (E)>

The polyamide resin composition of the present invention may contain a reinforcing material (E). Examples of the reinforcing material (E) include fibrous reinforcing materials, such as glass fiber, carbon fiber, aramid fiber, liquid crystal polymer (LCP) fiber, metal fiber, boron fiber, potassium titanate whisker, aluminum borate whisker, calcium carbonate whisker, magnesium sulfate whisker, zinc oxide whisker, calcium silicate whisker, graphite whisker, wollastonite, sepiolite, xonotlite, etc.; platy reinforcing materials, such as mica, hydrotalcite, glass flake, clay, montmorillonite, kaolin, etc.; powdered reinforcing materials, such as silica alumina, silica, alumina, titanium oxide, boron nitride, potassium titanate, calcium silicate, magnesium sulfate, asbestos, glass bead, graphite, molybdenum disulfide, phenol resin particle, crosslinked styrene-based resin particle, crosslinked acrylic resin particle, aramid particle, etc.; and the like.

Above of all, fibrous reinforcing materials are preferred from the viewpoint of a reinforcing effect, and a glass fiber is more preferred from the viewpoint of a low price. By compounding a fibrous reinforcing material, not only the strength of each of the resulting polyamide resin composition and molded article is improved, but also the dimensional stability and the low water absorbability are more improved. The glass fiber may be used for the raw material of the polyamide resin composition of the present invention as a pellet obtained by impregnating a roving thereof with the polyamide (A) or the like and then cutting into an appropriate length; or as a chopped strand, a milled fiber, or a cut fiber. Examples of a cross-sectional shape of the glass fiber include a circle, a cocoon shape, a flat shape, and the like.

In the case of using the reinforcing material (E), a lower limit value of its content is preferably 10 parts by mass, more preferably 30 parts by mass, and still more preferably 50 parts by mass based on 100 parts by mass of the polyamide (A). An upper limit value thereof is preferably 300 parts by mass, more preferably 200 parts by mass, and still more preferably 150 parts by mass. By selecting the content of the reinforcing material (E) within the foregoing range, a polyamide resin composition with more excellent strength is obtained.

For the purpose of increasing dispersibility in the polyamide resin composition, the surface of the reinforcing material (E) may be subjected to a surface treatment with a silane coupling agent, a titanium coupling agent, other polymer, or a low-molecular compound.

The polyamide resin composition of the present invention may contain a crystal nucleating agent. Examples of the crystal nucleating agent include talc, carbon black, and the like. These may be used solely or in combination of two or more kinds thereof.

In the case of using the crystal nucleating agent, a lower limit value of its content is preferably 0.001 parts by mass, more preferably 0.01 parts by mass, and still more preferably 0.1 parts by mass based on 100 parts by mass of the polyamide (A). An upper limit value thereof is preferably 10 parts by mass, more preferably 5 parts by mass, and still more preferably 2 parts by mass. By selecting the content of the crystal nucleating agent, a crystallization speed of the polyamide (A) can be increased.

The polyamide resin composition of the present invention may contain a lubricant. Examples of the lubricant include hydrocarbon-based lubricants, such as polyethylene wax, polypropylene wax, etc.; fatty acid-based lubricants, such as stearic acid, 12-hydroxystearic acid, etc.; higher alcohol-based lubricants, such as stearyl alcohol, etc.; aliphatic amide-based lubricants, such as stearic acid amide, oleic acid amide, erucic acid amide, methylenebisstearic acid amide, ethylenebisstearic acid amide, etc.; metallic soap-based lubricants, such as calcium stearate, zinc stearate, magnesium stearate, lead stearate, etc.; ester-based lubricants, such as stearic acid monoglyceride, butyl stearate, pentaerythritol tetrastearate, stearyl stearate, etc.; and the like. These may be used solely or in combination of two or more kinds thereof.

In the case of using the lubricant, a lower limit value of its content is preferably 0.01 parts by mass, more preferably 0.1 parts by mass, and still more preferably 0.5 parts by mass based on 100 parts by mass of the polyamide (A). An upper limit value thereof is preferably 5 parts by mass, more preferably 3 parts by mass, and still more preferably 1 part by mass.

The polyamide resin composition of the present invention may contain at least one metal compound selected from the group consisting of a metal oxide, a metal hydroxide, a metal carbonate, a metal borate, and a derivative of hydrotalcite from the viewpoint of reducing corrosion or abrasion of metallic components to be used on the occasion of producing a pellet of the polyamide resin composition, or on the occasion of molding the polyamide resin composition.

Examples of the metal oxide include iron oxide, calcium oxide, and the like. Examples of the metal hydroxide include magnesium hydroxide, aluminum hydroxide, barium hydroxide, alumina hydrate, and the like. Examples of the metal carbonate include magnesium carbonate and the like. Examples of the metal borate include zinc borate, magnesium borate, calcium borate, aluminum borate, and the like. Examples of the derivative of hydrotalcite include a material obtained by calcining hydrotalcite and dehydrating crystallization water, and the like. Above all, at least one selected from the group consisting of calcium oxide, zinc borate, and alumina hydrate is preferred in view of the fact that an effect for capturing an acidic substance is large.

The polyamide resin composition of the present invention may contain a dripping prevention agent for the purpose of increasing dripping preventing properties of the polyamide resin composition at the time of burning of a molded article. Examples of the dripping prevention agent include fluorine-based resins, such as fibrillated polytetrafluoroethylene, etc.; modified aromatic vinyl compound-based polymers; modified polyolefins, such as a maleic anhydride-modified ethylene-propylene copolymer, etc.; ionomers, and the like.

The polyamide resin composition of the present invention may contain a flame retardant aid. Examples of the flame retardant aid include flame retardant aids formed from a melamine-based compound, such as melamine, melam, melem, melon, etc., and a phosphoric acid compound, such as phosphoric acid, polyphosphoric acid, etc. As such a flame retardant aid, commercially available products may be used, and examples thereof include "MELAPUR 200" and "MELAPUR 200/70", manufacture by BASF SE, each of which is melamine polyphosphate; "PHOSMEL-200", manufactured by Nissan Chemical Industries, Ltd., which is melamine polyphosphate; and the like.

The polyamide resin composition of the present invention may contain an amide compound other than the polyamide (A) within the range where the effects of the present invention are not impaired. Examples of the amide compound include amide oligomers, aliphatic amides, aromatic carboxylic acid amides, bisamides of an aliphatic dicarboxylic acid, bisamides of an aliphatic diamine, bisamides of an aromatic dicarboxylic acid, polyamides having a melting point of lower than 280° C. (e.g., PA66, PA610, PA612, PA6, PA11, PA12, PA6/12 copolymer, a polyamide obtained from m-xylylenediamine and adipic acid, etc.), and the like. Above all, amide compounds obtained through a reaction of a mixture of a monocarboxylic acid and a dicarboxylic acid with a diamine, such as ethylenebisstearylamide, etc., are preferred. The amide compound is preferably an amide compound having a melting point of 80 to 260° C. from the viewpoints of fluidity and moldability of the polyamide resin composition. A molecular weight of the amide compound is preferably 300 to 3,000.

In order to improve impact resistance or toughness, the polyamide resin composition of the present invention may contain, for example, a modified elastomer (e.g., a maleic anhydride-modified ethylene-propylene copolymer, a maleic anhydride-modified ethylene-butene copolymer, a maleic anhydride-modified styrene-(ethylene/butene)-styrene block copolymer, etc.), polyphenylene sulfide, a liquid crystal polymer, syndiotactic polystyrene, polyphenylene oxide, or the like.

The polyamide resin composition of the present invention may contain, in addition to the foregoing materials, a thio-based or hindered amine-based antioxidant or other antioxidant; an UV absorber; a light stabilizer; a pigment; an antistatic agent; a plasticizer; or the like.

<Production Method of Polyamide Resin Composition>

The polyamide resin composition of the present invention may be produced by melt kneading the aforementioned polyamide (A), phosphinic acid salt (B), and phosphorous acid ester (C) by using, for example, a twin-screw extruder, followed by pelletization, and if desired, other components may be kneaded.

Examples of the extruder which is used for the production of the polyamide resin composition of the present invention include a single-screw extruder, a twin-screw extruder, and the like. Above all, a twin-screw extruder is preferred in view of the fact that it has self-cleaning properties and is excellent in productivity, and a vent type twin-screw extruder is more preferred. A ratio of a cylinder length (L) and a cylinder diameter (D) of the extruder (L/D) is preferably 40 or less, and a cylinder diameter (single diameter) is preferably 20 to 100 mm.

<Production Method of Molded Article>

By molding the polyamide resin composition of the present invention by a molding method which is generally adopted for thermoplastic resin compositions, such as injection molding, extrusion molding, press molding, blow molding, calendar molding, cast molding, etc., molded articles having various shapes can be produced.

Examples of an injection molding machine which is used on the occasion of performing the injection molding include a plunger type injection molding machine, a preplasticating injection molding machine, a screw in-line type injection molding machine, and the like. Above all, a preplasticating injection molding machine and a screw in-line type injection molding machine are preferred. A cylinder diameter of the injection molding machine is preferably 10 to 40 mm.

<Molded Article Including Polyamide Resin Composition>

The polyamide resin composition of the present invention may be used for the production of various electronic components, automotive components, household electrical appliances, building materials, sanitary articles, sports equipment, miscellaneous goods, and the like. Examples thereof include connectors, switches, sensors, sockets, capacitors, hard disk components, jacks, fuse holders, relays, coil bobbins, resistors, IC housings, reflectors or housings of LED, gears, bearing retainers, spring holders, chain tensioners, washers, various housings, weight rollers, breaker parts, clutch parts, and the like. Above all, the polyamide resin composition of the present invention can be suitably used for surface-mounting type connectors for which flame retardancy and heat resistance in response to a surface amounting process are required (e.g., card connectors, B to B connectors, FPC connectors, I/O connectors, USB connectors, earphone jacks, A/V connectors, etc.), sockets, camera modules, electric power components, switches, sensors, capacitor sheet plates, hard disk components, relays, resistors, fuse holders, coil bobbins, IC housings, reflectors of LED, or housings.

EXAMPLES

The present invention is hereunder more specifically described by reference to Examples, but it should be construed that the present invention is not limited to these Examples at all.

<Melting Point of Polyamide (A)>

10 mg of the polyamide (A) was completely melted by heating at 350° C. for 2 minutes in a nitrogen atmosphere by means of a differential scanning calorimeter (DSC822), manufactured by Mettler-Toledo International Inc. and then cooled to 50° C. at a rate of 10° C./min. Thereafter, when the temperature was continuously raised to 360° C. at a rate of 10° C./min, an appeared exothermic peak at the highest temperature was measured, and this was defined as a melting point (° C.) of the polyamide (A).

<Viscosity of Polyamide (A)>

A concentrated sulfuric acid solution of the polyamide (A) having a concentration of 0.2 g/dL was prepared, and its ηinh at 30° C. was measured using a Ubbelohde viscometer.

<Flame Retardancy>

A platy specimen (thickness: 0.4 mm, width: 12.5 mm, length: 125 mm) obtained by injection molding by using each of polyamide resin compositions prepared in the following Examples and Comparative Examples was used and evaluated for flame retardancy pursuant to the provisions as set forth in the UL-94 standard as described below. An upper end of the 0.4 mm-thick specimen is fastened by a clamp to fix the specimen vertically, a prescribed flame is brought into contact with a lower end of the specimen for 10 seconds and then kept away, and a burning time (first time) of the specimen is measured. Immediately after fire extinguishing, a flame is again brought into contact with the lower end of the specimen for 10 seconds and then kept away, and a burning time (second time) of the specimen is measured. The same measurement is repeated with respect to five specimens, thereby obtaining ten data in total including five data of the burning time (first time) and five data of the burning time (second time). A sum total of the ten data is defined as T, and a maximum value of the ten data is defined as M. The case where T is 50 seconds or less, M is 10 seconds or less, the specimen does not blaze up until the clamp, and a flamed molten material neither drips nor ignites dry cotton set under 12 inches down is "V-O"; the case where T is 250 seconds or less, M is 30 seconds or less, and besides, other conditions than T and M in V-0 are satisfied is "V-1"; and the case where T is 250 seconds or less, M is 30 seconds or less, the specimen does not blaze up until the clamp, and a flamed molten material drips and ignites the cotton set under 12 inches down is "V-2".

<Strength>

Each of polyamide resin compositions prepared in the following Examples and Comparative Examples was used and injection molded while providing a gate on the both ends in the longitudinal direction of a mold such that a weld was generated in a central portion of the longitudinal direction of an ASTM D638 Type 1 specimen. A weld strength (MPa) of the resulting specimen was measured pursuant to ASTM D638.

<Brightness>

A brightness (L*) of a platy specimen (30 mm×10 mm×0.5 mm) obtained by injection molding by using each of polyamide resin compositions prepared in the following Examples and Comparative Examples was measured at an angle of reflection of 2° by using a spectrophotometer, SD 5000, manufactured by Nippon Denshoku Industries Co., Ltd. and using D65 as a light source, and a measured value was defined as an index of the brightness of a molded article before a reflow step of the surface mounting process. The specimen was set in SMT Scope SP-5100, manufactured by Sanyo Seiko K.K. and subjected to a heat treatment assuming a reflow step by temperature rising in air from 25° C. to 150° C. for 60 seconds; subsequently temperature rising to 180° C. for 90 seconds; subsequently temperature rising to 260° C. for 60 seconds and keeping at 260° C. for 20 seconds; and then cooling to 100° C. over 30 seconds. The specimen was discharged and measured for a brightness (L*) by the aforementioned method, and a measured value was defined as an index of the brightness of a molded article after a reflow step of the surface mounting process.

<Yellowing>

A b-value of a platy specimen (30 mm×10 mm×0.5 mm) obtained by injection molding by using each of polyamide resin compositions prepared in the following Examples and Comparative Examples was measured at an angle of reflection of 2° by using a spectrophotometer, SD 5000, manufactured by Nippon Denshoku Industries Co., Ltd. and using D65 as a light source, and a measured value was defined as an index of the b-value of a molded article before a reflow step of the surface mounting process. The specimen was set in SMT Scope SP-5100, manufactured by Sanyo Seiko K.K. and subjected to a heat treatment assuming a reflow step by temperature rising in air from 25° C. to 150° C. for 60 seconds; subsequently temperature rising to 180° C. for 90 seconds; subsequently temperature rising to 260° C. for 60 seconds and keeping at 260° C. for 20 seconds; and then cooling to 100° C. over 30 seconds. The specimen was discharged and measured for a b-value by the aforementioned method, and a measured value was defined as an index of the b-value of a molded article after a reflow step of the surface mounting process. The b-value before the heat treatment was subtracted from the b-value after the heat treatment, and the resulting value was defined as an index of the yellowing in a reflow step of the surface mounting process.

The respective components used in the Examples and Comparative Examples are as follows.

<Polyamide (A)>

A-1: (PA9T)

In an autoclave having an internal volume of 40 L, 7,882.7 g of terephthalic acid, 7,742.9 g of a mixture of 1,9-nonanediamine and 2-methyl-1,8-octanediamine (molar ratio: 85/15), 358.4 g of benzoic acid as an end-capping agent, 16.0 g of sodium hypophosphite monohydrate, and 4 L of distilled water were charged and purged with nitrogen. The internal temperature was raised to 200° C. over 2 hours. At this time, the autoclave was subjected to pressure rising to 2 MPa. Thereafter, the internal temperature was kept at 215° C. for 2 hours to gradually remove a water vapor, and the contents were allowed to react with each other while keeping the pressure at 2 MPa. Subsequently, the pressure was dropped to 1.2 MPa over 30 minutes, thereby obtaining a prepolymer. This prepolymer was pulverized into a size of 6 mm or less and dried under reduced pressure at 120° C. for 12 hours. This was subjected to solid-phase polymerization under conditions at 230° C. and 13.3 Pa for 10 hours, thereby obtaining a polyamide (A-1) having a melting point of 306° C. and an ηinh of 0.78 dL/g.

A-2: (PA10T)

In an autoclave having an internal volume of 40 L, 7,558.1 g of terephthalic acid, 8,082.2 g of 1,10-decanediamine, 343.7 g of benzoic acid as an end-capping agent, 16.0 g of sodium hypophosphite monohydrate, and 4 L of distilled water were charged and purged with nitrogen. The internal temperature was raised to 200° C. over 2 hours. At this time, the autoclave was subjected to pressure rising to 2 MPa. Thereafter, the internal temperature was kept at 215° C. for 2 hours to gradually remove a water vapor, and the contents were allowed to react with each other while keeping the pressure at 2 MPa. Subsequently, the pressure was dropped to 1.2 MPa over 30 minutes, thereby obtaining a prepolymer. This prepolymer was pulverized into a size of 6 mm or less and dried under reduced pressure at 120° C. for 12 hours. This was subjected to solid-phase polymerization under conditions at 230° C. and 13.3 Pa for 10 hours, thereby obtaining a polyamide (A-2) having a melting point of 317° C. and an ηinh of 0.80 dL/g.

A-3: (PA6/6T)

In an autoclave having an internal volume of 40 L, 5,248.7 g of terephthalic acid, 3,777.7 g of adipic acid, 6,523.7 g of 1,6-hexanediamine, 433.9 g of benzoic acid as an end-capping agent, 16.0 g of sodium hypophosphite monohydrate, and 4 L of distilled water were charged and purged with nitrogen. The internal temperature was raised to 200° C. over 2 hours. At this time, the autoclave was subjected to pressure rising to 2 MPa. Thereafter, the internal temperature was kept at 215° C. for 2 hours to gradually remove a water vapor, and the contents were allowed to react with each other while keeping the pressure at 2 MPa. Subsequently, the pressure was dropped to 1.2 MPa over 30 minutes, thereby obtaining a prepolymer. This prepolymer was pulverized into a size of 6 mm or less and dried under reduced pressure at 120° C. for 12 hours. This was subjected to solid-phase polymerization under conditions at 230° C. and 13.3 Pa for 10 hours, thereby obtaining a polyamide (A-3) having a melting point of 310° C. and an ηinh of 0.82 dL/g.

A-4: (PA66)

In an autoclave having an internal volume of 40 L, 8,740.2 g of adipic acid, 6,792.1 g of 1,6-hexanediamine, 451.8 g of benzoic acid as an end-capping agent, 16.0 g of sodium hypophosphite monohydrate, and 4 L of distilled water were charged and purged with nitrogen. The internal temperature was raised to 200° C. over 2 hours. At this time, the autoclave was subjected to pressure rising to 2 MPa. Thereafter, the internal temperature was kept at 215° C. for 2 hours to gradually remove a water vapor, and the contents were allowed to react with each other while keeping the pressure at 2 MPa. Subsequently, the pressure was dropped to 1.2 MPa over 30 minutes, thereby obtaining a prepolymer. This prepolymer was pulverized into a size of 6 mm or less and dried under reduced pressure at 120° C. for 12 hours. This was subjected to solid-phase polymerization under conditions at 230° C. and 13.3 Pa for 10 hours, thereby obtaining a polyamide (A-4) having a melting point of 262° C. and an ηinh of 0.80 dL/g.

<Phosphinic Acid Salt (B)>

B-1: EXOLIT OP 1230 (manufactured by Clariant, aluminum diethylphosphinate, number average particle diameter: 25 μm)

<Phosphorous Acid Ester (C)>

C-1: IRGAFOS 168 (manufactured by BASF SE)

C-2: SUMILIZER GP (manufactured by Sumitomo Chemical Co., Ltd.)

<Phenol-Based Stabilizer (D)>

D-1: IRGANOX 1098 (manufactured by BASF SE)

D-2: SUMILIZER GA-80 (manufactured by Sumitomo Chemical Co., Ltd.)

<Reinforcing Material (E)>

E-1: Glass fiber "CS 3G-225" (manufactured by Nitto Boseki Co., Ltd., cross-sectional shape: circle, 3 mm chopped strand, fiber diameter: 9.5 μm)

E-2: Glass fiber "CSH 3PA-870" (manufactured by Nitto Boseki Co., Ltd., cross-sectional shape: cocoon type, 3 mm chopped strand)

<Phosphorus-Based Stabilize Other than the Aforementioned (C)>

PEP-36 (manufactured by Adeka Corporation, 3,9-bis(2,6-di-tert-butyl-4-methylphenoxy)-2,4,8,10-tetraoxa-3,9-diphosphaspiro[5.5]undecane)

GSY-P101 (manufactured by Osaki Industry Co., Ltd., tetrakis(2,4-di-tert-butyl-5-methylphenyl)[1,1-biphenyl]-4,4'-diyl bisphosphonite)

<Other Components>

MICRON WHITE #5000S (manufactured by Hayashi-Kasei Co., Ltd., talc)

HI-WAX 200P (manufactured by Mitsui Chemicals, Inc., polypropylene wax)

Examples 1 to 9 and Comparative Examples 1 to 5

The respective components were melt kneaded in proportions shown in Table 1 at a cylinder temperature of 10 to 30° C. higher than the melting point of the polyamide (A) by using a twin-screw extruder, manufactured by Research Laboratory of Plastics Technology Co., Ltd. (screw diameter: 30 mmφ, L/D=32, rotation number: 150 rpm, discharge rate: 10 kg/h), a melt kneaded polyamide resin composition was extruded in a strand form, and after cooling, the resultant was cut to obtain a pellet-shaped polyamide resin composition. The phosphinic acid salt (B), the phosphorous acid ester (C), and the phosphorus-based stabilizer other than (C) were fed from a side feeder, and other components were dry blended and collectively fed from a hopper in the most upstream portion. Various specimens were prepared from the resulting pellet-shaped polyamide resin compositions and measured for various physical properties. The results are shown in Table 1.

TABLE 1

|  | Example | | | | | | | | | Comparative Example | | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 | 5 |
| Formulation of polyamide resin composition (parts by mass) |  |  |  |  |  |  |  |  |  |  |  |  |  |  |
| Polyamide (A) |  |  |  |  |  |  |  |  |  |  |  |  |  |  |
| A-1 | 100 | 100 |  |  | 100 | 100 | 100 | 100 | 100 | 100 | 100 | 100 | 100 | 100 |
| A-2 |  |  | 100 |  |  |  |  |  |  |  |  |  |  |  |

TABLE 1-continued

|  | Example ||||||||| Comparative Example |||||
|---|---|---|---|---|---|---|---|---|---|---|---|---|---|---|
|  | 1 | 2 | 3 | 4 | 5 | 6 | 7 | 8 | 9 | 1 | 2 | 3 | 4 | 5 |
| A-3 |  |  |  | 100 |  |  |  |  |  |  |  |  |  |  |
| A-4 |  |  |  |  |  |  |  |  |  |  |  |  |  | 100 |
| Phosphinic acid salt (B) |  |  |  |  |  |  |  |  |  |  |  |  |  |  |
| B-1 | 23 | 23 | 23 | 23 | 23 | 23 | 23 | 23 | 23 | 23 | 23 | 23 | 23 | 23 |
| Phosphorous acid ester (C) |  |  |  |  |  |  |  |  |  |  |  |  |  |  |
| C-1 | 0.45 |  | 0.45 | 0.45 | 0.23 | 0.23 | 0.45 | 0.45 | 2.3 |  |  |  |  | 0.45 |
| C-2 |  | 0.45 |  |  |  |  |  |  |  |  |  |  |  |  |
| Phosphorus-based stabilizer other than (C) |  |  |  |  |  |  |  |  |  |  |  |  |  |  |
| PEP-36 |  |  |  |  |  |  |  |  |  | 0.45 |  |  |  |  |
| GSY-P101 |  |  |  |  |  |  |  |  |  |  | 0.45 |  |  |  |
| Phenol-based stabilizer (D) |  |  |  |  |  |  |  |  |  |  |  |  |  |  |
| D-1 |  |  |  |  | 0.23 |  |  |  |  |  |  |  |  |  |
| D-2 |  |  |  |  |  | 0.23 |  |  |  |  |  |  | 0.45 |  |
| Reinforcing material (E) |  |  |  |  |  |  |  |  |  |  |  |  |  |  |
| E-1 | 102 | 102 | 102 | 102 | 102 | 102 | 68 |  | 102 | 102 | 102 | 102 | 102 | 102 |
| E-2 |  |  |  |  |  |  | 34 | 102 |  |  |  |  |  |  |
| Other components |  |  |  |  |  |  |  |  |  |  |  |  |  |  |
| MICRON WHITE #5000S | 0.45 | 0.45 | 0.45 | 0.45 | 0.45 | 0.45 | 0.45 | 0.45 | 0.45 | 0.45 | 0.45 | 0.45 | 0.45 | 0.45 |
| HI-WAX 200P | 0.68 | 0.68 | 0.68 | 0.68 | 0.68 | 0.68 | 0.68 | 0.68 | 0.68 | 0.68 | 0.68 | 0.68 | 0.68 | 0.68 |
| Physical properties of polyamide (A) |  |  |  |  |  |  |  |  |  |  |  |  |  |  |
| Melting point (° C.) | 306 | 306 | 317 | 310 | 306 | 306 | 306 | 306 | 306 | 306 | 306 | 306 | 306 | 262 |
| Intrinsic viscosity (dL/g) | 0.78 | 0.78 | 0.80 | 0.82 | 0.78 | 0.78 | 0.78 | 0.78 | 0.78 | 0.78 | 0.78 | 0.78 | 0.78 | 0.80 |
| Physical properties of polyamide resin composition |  |  |  |  |  |  |  |  |  |  |  |  |  |  |
| Flame retardancy (Class) | V-0 | V-0 | V-0 | V-0 | V-0 | V-0 | V-0 | V-0 | V-0 | V-0 | V-0 | V-0 | V-0 | V-0 |
| Strength (MPa) | 40 | 39 | 38 | 45 | 38 | 38 | 40 | 44 | 23 | 27 | 39 | 38 | 29 | 43 |
| Brightness (before reflow step) | 71 | 71 | 71 | 70 | 72 | 71 | 71 | 73 | 72 | 65 | 67 | 68 | 68 | 69 |
| Brightness (after reflow step) | 73 | 74 | 73 | 72 | 74 | 73 | 73 | 73 | 75 | 63 | 70 | 70 | 70 | 71 |
| b-Value (before reflow step) | -2.3 | -2.5 | -2.5 | -2.4 | -2.7 | -2.2 | -2.3 | -2.3 | -1.6 | 2.1 | 0.4 | 0.2 | 1.5 | -2.2 |
| b-Value (after reflow step) | 6.1 | 6.0 | 5.7 | 6.3 | 5.5 | 5.9 | 6.0 | 6.0 | 3.0 | 12.2 | 10.2 | 10.3 | 12.0 | 6.8 |
| Yellowing | 8.4 | 8.5 | 8.2 | 8.7 | 8.2 | 8.1 | 8.3 | 8.3 | 4.6 | 10.1 | 9.8 | 10.1 | 10.5 | 9.0 |

All of the polyamide resin compositions of Examples 1 to 9 have high flame retardancy of a V-0 class of UL94, exhibit a high brightness before and after the reflow step, and even after going through the reflow step, is small in yellowing. In particular, in Examples 1 to 8, the strength is further excellent. In addition, in Examples 5 and 6 in which the phenol-based stabilizer (D) is compounded, the yellowing is smaller. In Comparative Examples 1 to 4, since the phosphorous acid ester (C) is not compounded, the brightness before and after the reflow step is low, and the yellowing is large, as compared with Examples 1 to 9. In Comparative Example 5, since the polyamide having a melting point of lower than 280° C., the respective physical properties other than the flame retardancy and the strength are inferior, as compared with Examples 1 to 9.

The invention claimed:

1. A polyamide resin composition comprising:
   100 parts by mass of (A) a polyamide having a melting point of 280 to 330° C.;
   0.5 to 80 parts by mass of (B) aluminum diethylphosphinate;
   0.2 to 2 parts by mass of (C) at least one phosphorous acid ester represented by formula (6) or (7); and
   (E) at least one reinforcing material, wherein a mass ratio of the at least one phosphinic acid salt (B) to the at least one phosphorous acid ester (C) ((B)/(C)) is in a range of from 10 to 100, and an average particle diameter of the phosphinic acid salt (B) is 0.1 to 100 μm:

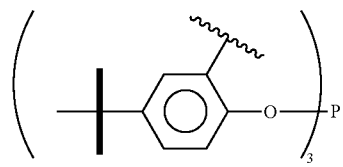
(6)

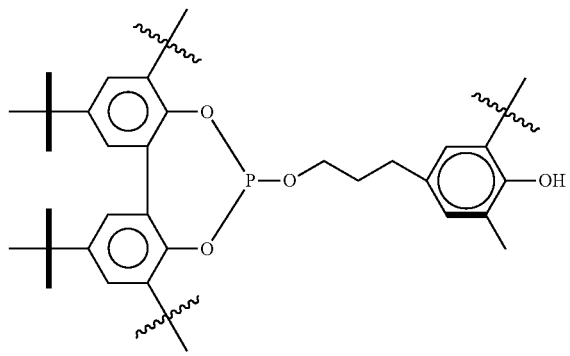
(7)

wherein the polyamide resin composition does not comprise a metallic soap-based lubricant.

2. The polyamide resin composition according to claim 1, wherein the aluminum diethylphosphinate (B) is contained in an amount of 7 to 30 parts by mass based on 100 parts by mass of the polyamide (A).

3. The polyamide resin composition according to claim 1, wherein the phosphorous acid ester (C) is a compound represented by formula (6):

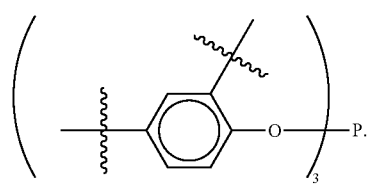
(6)

4. The polyamide resin composition according to claim 1, wherein the phosphorous acid ester (C) is a compound represented by formula (7):

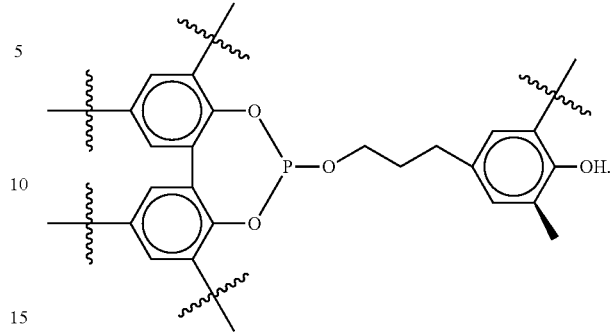
(7)

5. The polyamide resin composition according to claim 1, further comprising (D) a phenol-based stabilizer in an amount of 0.001 to 7 parts by mass based on 100 parts by mass of the polyamide (A).

6. The polyamide resin composition according to claim 5, wherein the phenol-based stabilizer (D) is contained in an amount of 0.2 to 0.5 parts by mass based on 100 parts by mass of the polyamide (A).

7. The polyamide resin composition according to claim 1, wherein the polyamide (A) comprises an aromatic dicarboxylic acid unit and an aliphatic diamine unit.

8. The polyamide resin composition according to claim 7, wherein the aliphatic diamine is an aliphatic diamine having 4 to 18 carbon atoms.

9. The polyamide resin composition according to claim 1, wherein the reinforcing material (E) is a fibrous reinforcing material.

10. A molded article comprising the polyamide resin composition according to claim 1.

11. The polyamide resin composition according to claim 1, wherein the polyamide resin composition consists of:
   (A) the polyamide;
   (B) aluminum diethylphosphinate;
   (C) the at least one phosphorous acid ester represented by formula (6) or (7);
   (E) the at least one reinforcing material selected from the group consisting of: a glass fiber, a carbon fiber, an aramid fiber, a liquid crystal polymer fiber, a metal fiber, and a boron fiber;
   optionally, at least one phosphine-based stabilizer other than the at least one phosphorous acid ester;
   optionally, at least one phenol-based stabilizer;
   optionally, at least one crystal nucleating agent selected from the group consisting of: a talc and a carbon black;
   optionally, at least one lubricant selected from the group consisting of: a hydrocarbon-based lubricant, a fatty acid lubricant, an aliphatic amide-based lubricant, and an ester-based lubricant;
   optionally, at least one dripping prevention agent selected from the group consisting of: a fluorine-based resin, a modified aromatic vinyl compound-based polymer; a modified polyolefin, and an ionomer;
   optionally, at least one flame retardant aid formed from a melamine-based compound and a phosphoric acid compound;
   optionally, at least one amide compound other than the polyamide, selected from the group consisting of an amide oligomer, an aliphatic amide, an aromatic carboxylic acid amide, a bisamide of an aliphatic dicarboxylic acid, a bisamide of an aliphatic diamine, a bisamide of an aromatic dicarboxylic acid, a polyamide having a melting point of lower than 280° C.;

optionally, at least one polymer selected from the group consisting of: a modified elastomer, a polyphenylene sulfide, a liquid crystal polymer, a syndiotactic polystyrene, and a polyphenylene oxide; and optionally, at least one selected from the group consisting of: a thio-based or hindered amine-based antioxidant, an UV absorber, a light stabilizer, an antistatic agent, and a plasticizer.

12. The polyamide resin composition according to claim 1, wherein the mass ratio (B)/(C) is from 51.1 to 100.

* * * * *